United States Patent
Neugebauer (10) Patent No.: US 9,613,599 B2
(45) Date of Patent: Apr. 4, 2017

(54) ELECTROPHORETIC DISPLAY DRIVE TECHNIQUES

(71) Applicant: Nook Digital, LLC, New York, NY (US)

(72) Inventor: Charles F. Neugebauer, Los Altos, CA (US)

(73) Assignee: Nook Digital, LLC, New York, NY (US)

( * ) Notice: Subject to any disclaimer, the term of this patent is extended or adjusted under 35 U.S.C. 154(b) by 0 days.

(21) Appl. No.: 14/671,974

(22) Filed: Mar. 27, 2015

(65) Prior Publication Data

US 2016/0284323 A1    Sep. 29, 2016

(51) Int. Cl.
*G09G 5/00* (2006.01)
*G09G 5/397* (2006.01)
*G02F 1/167* (2006.01)
*G06F 3/14* (2006.01)
*G09G 3/34* (2006.01)

(52) U.S. Cl.
CPC ............ *G09G 5/397* (2013.01); *G02F 1/167* (2013.01); *G06F 3/1415* (2013.01); *G09G 3/344* (2013.01); *G09G 2380/14* (2013.01)

(58) Field of Classification Search
CPC ............... G09G 3/344; G09G 2310/06; G09G 2230/00; G09G 2310/0254; G09G 2310/068; G09G 2380/14
See application file for complete search history.

(56) References Cited

U.S. PATENT DOCUMENTS

2008/0309636 A1*  12/2008  Feng ................... G09G 3/344
                                                                  345/173
2011/0080418 A1*  4/2011  Rhodes ................. G09G 5/393
                                                                  345/522

OTHER PUBLICATIONS

Baker, et al., "Smart Driver for Power Reduction in Next Generation Bistable Electrophoretic Display Technology," Codes+ISSS '07, Sep. 30-Oct. 3, 2007, Salzburg, Austria. 6 pages.

* cited by examiner

*Primary Examiner* — Hau Nguyen
(74) *Attorney, Agent, or Firm* — Finch & Maloney PLLC (57) ABSTRACT

Techniques for updating an electrophoretic display or other integrating display are provided. A first image data representing the current optical state of the display is combined with a second image data representing the desired next optical state of the display along with a third data representing the charge history of the display to form a compact intermediate representation of the electrical drive signals required to transition the display. Such compact intermediate representations can be provided for each pixel of the display and stored in flash memory. Once determined, these representations of the drive signals can be rapidly replayed from flash memory and further processed to drive the display and affect the desired optical transition from current image to next image while correcting for DC imbalances.

18 Claims, 5 Drawing Sheets

ELECTROPHORETIC DISPLAY DRIVE TECHNIQUES

FIELD OF THE DISCLOSURE

The present application relates to display technology, and more specifically to integrating displays such as electrophoretic displays.

BACKGROUND

Reflective electrophoretic displays (EPDs) are used in a number of applications where common emissive display technologies such as liquid crystal displays (LCDs) exhibit limitations. The most popular types of EPDs have two key distinctions compared to the more common continuously refreshed LCDs and organic light emitting diode (OLED) displays, namely that they are that they are reflective (rather than emissive), and can also maintain optical state without any applied electrical drive energy. Combined, these two properties give EPDs an advantage in bright environments for applications that show mostly long-dwell content (e.g., electronic books or so-called eBooks, and price labels or other digital readouts) and benefit from low power consumption.

The most common application for large EPDs is currently electronic book readers, although there are other applications as well, such as electronic signage. The canonical architecture for an EPD e-reader is typically comprised of a system-on-chip (SoC) running a Linux-based operating system (e.g., Android), connecting over WiFi and driving an EPD. One architectural limitation of EPD based e-readers is a consequence of the EPD's physical response to electrical stimuli which necessitates an image update process that is very different from continuously refreshed LCDs. There are two particular implications with respect to this architectural limitation. First, EPDs are generally relatively slow to update; to achieve a pixel transition from a black state to a white state may take 250 milliseconds or more, in contrast to LCDs which often respond within 10's of milliseconds or faster. Second, most EPDs exhibit a memory effect, i.e., once the electrical stimulus is stopped the black/gray/white state of the EPD material or so-called electronic ink is approximately static. The EPD effectively integrates the time-varying electrical stimuli provided by the driving chips and display system to change from a known starting optical state to a desired end optical state. As such, an EPD display is referred to herein as one example of an integrating display.

DETAILED DESCRIPTION

Techniques are disclosed for efficiently and quickly updating electrophoretic displays (EPD), and other such integrating displays that integrate a time-varying drive signal to change from a current optical state to a next optical state. In an embodiment, a display driver system is configured to update an EPD using a drive signal calculation phase followed by an update display phase. The calculation phase effectively decomposes the image update into a number of compactly encoded intermediate files, and the subsequent update display phase replays the calculated files repeatedly and sequentially to update the display. The compact intermediate files are representations of the drive signals needed to effect the display update and can be implemented in a number of ways. In one example case, a first image data representing the current optical state of the display for a given pixel position is combined with a second image data representing the next optical state of the display for that pixel position, thereby forming an index into a waveform (drive signal) look-up process. In another example case, the index is formed by further combining the current and next image pixel data with a third data representing the charge history of that pixel. In any such cases, the output of the waveform look-up process yields a multi-pass drive signal that transitions the corresponding pixel from the current image to the next image. This calculation is done for each pixel, and the resulting intermediate files are stored in a memory. During the subsequent update display phase, these representations of the target drive signals are rapidly replayed from the memory and further processed to drive the display and cause the desired optical transition from current image to next image while correcting for direct current (DC) imbalances. A consequence of the this multi-pass process is that it can be used to efficiently and quickly update a high resolution integrating display such as an EPD using low cost memory components such as flash memory, rather than relatively more expensive memory. As will be further appreciated in light of this disclosure, the multi-pass process can be used to offload the computational requirements such that very low cost and power efficient EPDs can be produced.

Overview and Context

Before further explaining the display drive techniques provided herein, it may be helpful to first review some of the various possible EPD driving techniques and various features associated with EPD technology to give proper context. Such review may be particularly helpful in assisting the reader to better appreciate the nuance of the techniques provided in the present disclosure.

While EPDs can respond to multilevel (e.g., 256 levels, or 8 bit) analog voltages to achieve grayscale, it is prudent for cost reasons to apply a time-modulated three level voltage (+V, 0, −V) to EPDs as a quick succession of three-levels-per-pixel image frames to achieve multiple gray levels. Typical EPD material response is sufficiently slow (e.g., 250 ms transition time) compared to easily achievable SoC display driving hardware frame rates (e.g., 85 Hz, which is approximately 12 ms per frame) that enough gray levels (e.g., 8 to 16) can be achieved to render anti-aliased text well (e.g., 250 ms/12 ms≈21 distinct raw levels of varying gray shades, sufficient to support 3-bpp or 4-bpp grayscale images conceptually). As a consequence of the EPD physical response, the most common driving architecture for EPD e-readers uses a relatively high frame rate display controller (e.g., 85 Hz) to provide a frame-by-frame varying three-level-per-pixel image change sequence encoded with 2 bits per pixel (bpp) per frame. Any image areas that are to be left unchanged may repeatedly receive 0V stimuli for the entire multi-frame sequence—only pixels that are changing gray state are required to be driven at +V or −V for one or more frames.

An additional constraint on the EPD driving process is due to the integrating nature of the EPD material itself; in contrast to LCD devices, whose state is directly related to the currently applied voltage with little or no history effect, EPDs are typically engineered with a strong memory effect so that they will retain their optical state once the driving waveforms are discontinued. In order to drive from one gray state to another, the EPD controller must make an assumption about the initial state of the pixel, the last image shown, for example. However, any cumulative grayscale imperfections arising from the quantized nature of the drive (i.e., some integer number of frame periods at +V, −V or 0V), the manufacturing variance of the EPD material, its driving history, and/or a temperature measurement or response error, among other things, will result in an imperfect post-drive optical state. To counter the effect of such intrinsic and/or accumulating pixel grayscale errors, the EPD material can be driven to optical saturation (e.g., a nearly full black or white state) where driving it harder into a black or white rail will have a negligible effect on the grayshade. This allows the driving system to better know the pixel state with reasonable certainty; using such an overdrive periodically at the start of a frame change can counter grayscale error accumulation. However, such drive sequences (driving the whole image or a significant fraction of the pixels to a full black or white state before updating them to their final desired state) is noticeable to users as a flashing transition. Such clearing or resetting transitions are generally slower than direct transitions since the EPD must first transit to a full black or white state, then additionally transition to the desired final grayscale state. This presents a tradeoff—one can choose more frequent clearing/resetting which will result in improved grayscale accuracy at the expense of flashing and transition time, or alternatively, one can choose making fewer clears/resets which will speedup response but lead to an accumulation of pixel errors. Since the errors are most pronounced at changing pixels, the pixel errors often resemble prior displayed images; for this reason these cumulative pixels errors are termed ghosting.

The process of changing from a current image to a new image on an EPD comprises the steps of first computing the difference between the current optical state of the EPD (e.g., the last image shown) and the new image to be shown. In the most commercially significant implementations, the image difference is then used to look-up a per-pixel time-sequence of two bit values (selecting one of +V, −V or 0 voltage states) that is then driven to the EPD as a time sequence of frames to cause the image transition. The look-up table encodes the sequence of 2-bit per pixel (2-bpp) values for generating the desired change in optical state of the EPD; these waveform look-up tables are often empirically tuned per manufacturing batch of EPD material to achieve accurate and/or fast grayscale transitions. In practice, there are additional effects captured in the look-up table for a given EPD. EPD transition times are strongly temperature dependent. As such, waveform look-up tables are usually provided for a number of different temperature ranges with unique tables for temperature differences as small as a few degrees C. Additionally, waveforms may be selectively optimized for transition speed at the expense of grayscale accuracy, for example, resulting in additional tables.

In addition to encoding the sequence of +V, −V and 0 voltages to cause a given grayscale change, the waveform tables may also account for the DC balance of the EPD material. If repetitively driven with an imbalanced waveform (such as the example case where +V is driven more often than −V over long time scales), the EPD material will suffer long term changes to its response characteristic often leading to a phenomena known as permanent ghosting, image burn-in, and/or image sticking where a residual image corresponding to the long term DC imbalance is faintly visible, blended with the desired image. To prevent such image sticking phenomena, waveform tables are often constructed to be directly DC balanced, wherein each transition from one gray level to another is explicitly constrained to be DC balanced, so that all transition combinations (from any grayscale level to any other grayscale level) are intrinsically balanced. Alternatively, a transition can be constructed to DC compensate for the last transition's ending, thus assuring (over the last transition's end and the current transition's beginning) that DC balance is maintained. These types of constructions, while guaranteed safe for the panel from a DC perspective, can have negative side effects. For instance, direct DC balance of every transition, pair of transitions, or pair of partial transitions can negatively impact transition time, flashing, and/or optical accuracy of the EPD.

Figure 1:
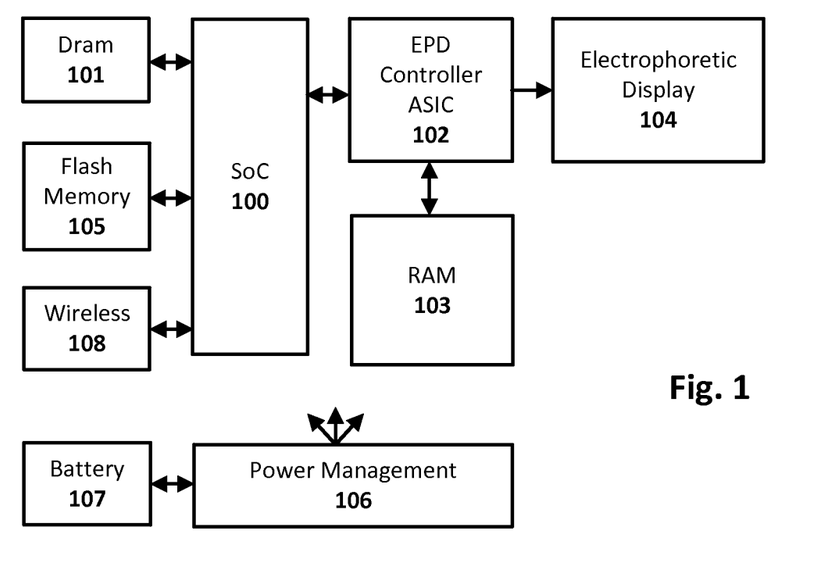
FIG. 1 illustrates block diagram of a first comparative EPD driving system based on an EPD controller ASIC and external random access memory (RAM) configuration.
Figure 2:
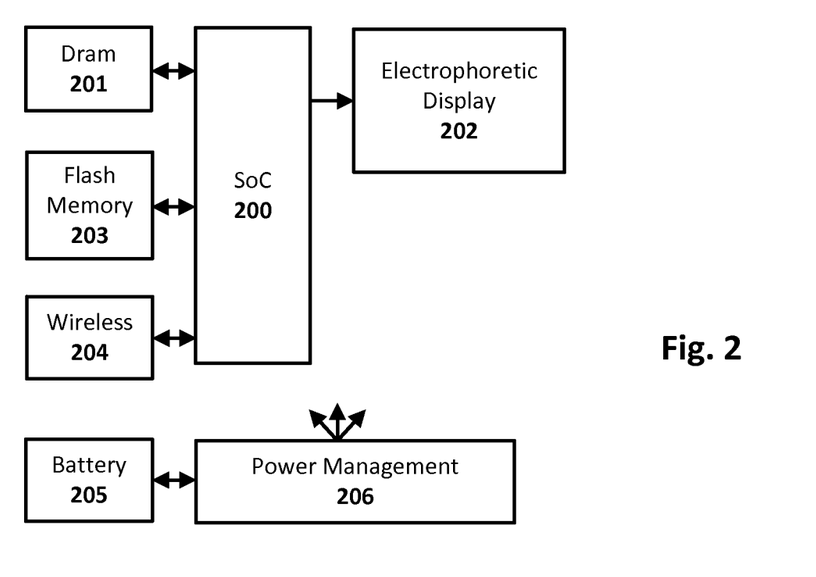
FIG. 2 illustrates a block diagram of a second comparative EPD driving system based on a SoC with a software or embedded EPD controller and external RAM configuration.

In contrast to simply refreshed displays such as LCDs, the EPD drive signals are relatively complex to determine, in that EPDs require more than the new frame information. In more detail, the calculation of the required sequence of 2-bpp frames typically should take into account at least the following variables for decent grayscale control as required by e-readers: the previous image, the desired new image, the temperature of the EPD, and the desired transition type (e.g., fast and inaccurate, clearing/setting, slow and accurate, to name a few possible example scenarios). Historically, the determination of these waveforms or drive signals was performed in a dedicated hardware subsystem consisting of an EPD application specific integrated circuit (ASIC) and a dedicated frame buffer memory. FIG. 1 shows an example of one such architecture, and will be discussed in turn. With the proliferation and cost reduction of high speed SoCs used in mobile phones, the most common architecture has evolved to a more software-based approach wherein a software block compiles the various inputs into a sequence of 2-bpp frames that are temporarily stored in main system memory (typically external dynamic random access memory, or DRAM) that are then sequentially scanned to the EPD through an SoC video port to affect the desired image change. FIG. 2 shows an example of this architecture, and will be discussed in turn. Note that the particular configurations of FIGS. 1 and 2 are not necessarily provided as examples of conventional architecture; rather, they are provided as comparative architectures.

FIG. 1 shows a block diagram of an example EPD driving system based on an EPD controller ASIC. In operation, the system-on-chip (SoC) 100 renders a new image for display using content stored in flash memory 105 and stores this image in its external DRAM memory 101 in a simple serialized array data structure. The SoC 100 will then provide this new image to the EPD controller ASIC 102 which stores the image and/or one or more processed versions of the image temporarily in a second external RAM 103. The EPD controller ASIC 102 has access to a waveform data structure containing look-up tables that capture the particular EPD display 104 characteristics by providing a sequence of pixel driving states (one of +V, −V or 0 volts) to affect the desired change in pixel optical state while preserving DC charge balance. To initiate an image transition, the SoC 100 sends a command to the EPD controller ASIC 102 that triggers both the computation of a specific sequence of frames as well as the output drive of the specific sequence of frames. In a standby power state, SoC 100 enters a low power idle state after storing critical state information into the external DRAM memory 101 and putting that memory 101 into a low powered self-refresh mode. Other major components including power management 106, battery 107 and a wireless connectivity subsystem 108 (e.g., WiFi or BlueTooth) can be used to further round out the system.

FIG. 2 illustrates a block diagram of an EPD driving system based on an SoC with a software or embedded EPD controller. In operation, the SoC 200 renders a new image for display from content stored in flash memory 203 and stores this image temporarily in external DRAM memory 201. The SoC 200 will then trigger the calculation of 2-bpp frames based on the current image, the desired new image and waveform data for the particular EPD at a given temperature and place the compiled 2-bpp frame sequence(s) into the external DRAM 201 temporarily until they are driven to the EPD 202. Similarly to the system of FIG. 1, the standby power state is achieved when the SoC 200 enters a low power idle state after storing critical state information into the external DRAM memory 201 that is subsequently placed in a low powered self-refresh state. Power management block 206, battery 205 and wireless subsystems 204 can be used to further supplement the system.

Note that additional elements and components not shown (e.g., buttons, touch screen, battery and battery gas gauge, audio subsystem, front lights, to name a few) may be desirable features in an e-reader. As will be appreciated, some embodiments of the present disclosure are primarily concerned with the major components that play a role in the driving of the EPD or overall system function related to standby power. To this end, and as will be further appreciated, the addition of such additional or accessory elements to the EPD driving system architecture does not fundamentally change or limit the present disclosure to any particular configuration or architecture scheme.

In any such cases, despite the relatively slow speed of the EPD image transitions, the data throughput demands are surprisingly high. During compilation, two frames of image data must be combined to make an output (as contrasted with just one for LCDs), and during EPD driving, the SoC subsystem must provide a sequence of potentially unique 85 Hz frames to the EPD display (as contrasted with typical 60 Hz frames for LCDs, where repeated frames can often be tolerated). The lower number of grayscales (e.g., 16 grayscales contrasted with 16 M colors for 24-bpp LCDs) does mitigate the computational load somewhat, but the high frame rate, unique and precise sequencing and multiple input frames require non-trivial compute and memory resources (size and speed). When combined with other functions typically required of e-readers (e.g., establishing connectivity, procuring and decrypting digital content, rendering pages, implementing responsive user interfaces, dictionaries, search, library synchronization, etc.), the typical system architecture requires a decently efficient processor core running at nearly smartphone-like speeds to give a good user experience. Rounding out the typical system, non-volatile storage (e.g., flash memory) is required to store the operating system (e.g., Android or Linux-based), applications (e.g., the reader application), and digital content (e.g., ePubs, PDFs, etc.).

As a consequence of this computational load, the conventional EPD reader architecture has a mobile phone scale processor along with a mobile phone sized battery (e.g., 1000 mAh to 1500 mAh lithium polymer battery pack). The digital subsystems, especially the SoC and RAM, consume significant power compared to what is actually needed by an EPD device (which is effectively zero power in between image updates) for average reader usage patterns, and as will be appreciated in light of this disclosure. Furthermore, due to the complexity and pedigree of the operating systems commonly used pursuant to mobile phone heritage (typically, Linux, Android or other such robust operating systems), shutting the operating system or so-called OS completely off to save power in standby incurs a significant reboot time (e.g., 30 seconds from a cold start for many current e-readers). In order to be responsive to a user's startup request (e.g., within a few seconds of pushing the power button), it is common to put the SoC into a nonzero power standby state with the SoC idling and the RAM in a low power refresh mode. A consequence of this (relatively) fast wake feature and large OS is that the power consumption of the typical e-reader device in standby is actually quite high. Thus, it is typical to budget a significant (oftentimes the dominant) portion of the battery capacity to standby (inactive) operation.

Thus, and in accordance with an embodiment of the present disclosure, an EPD drive system is provided that minimizes or otherwise reduces the amount of computation and memory required in the device to save power and cost. The system may be implemented, for example, as a high resolution EPD drive system that can update the EPD directly from flash memory and does not require external RAM-based frame buffers, despite the severe bandwidth limitations that flash memory exhibits compared to RAM. In some embodiments, the EPD drive system may be further configured to with a DC charge balance monitoring and correcting system, and/or a system for optimizing drive waveforms using EPD specific empirical data and an offline optimization pass. Numerous other embodiments and variations will be apparent in light of this disclosure.

Display Driver Architecture

Figure 3:
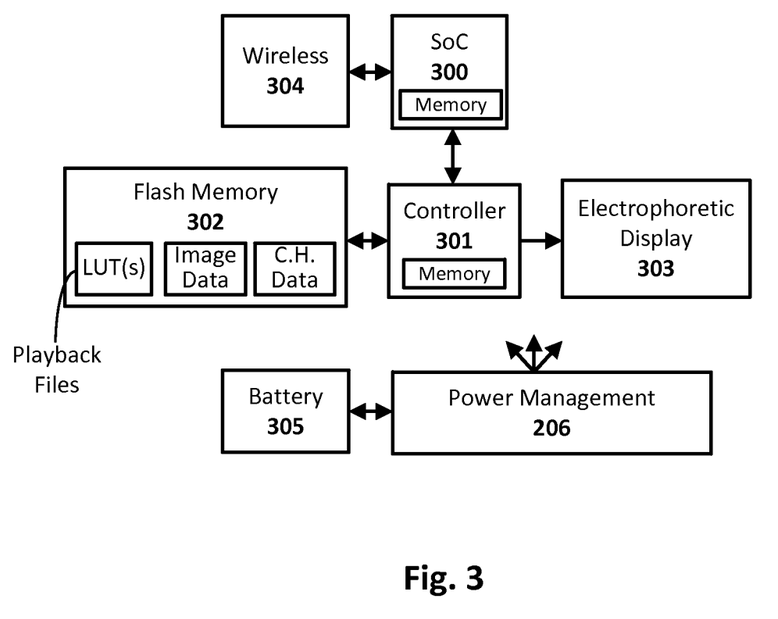
FIG. 3 illustrates a block diagram of an EPD driving system configured to utilize flash memory as both the content source and working memory for the EPD image update process, in accordance with an embodiment of the present disclosure.

FIG. 3 illustrates a block diagram of an EPD driving system configured in accordance with an embodiment of the present disclosure. As can be seen, this particular example system includes a SoC 300, a system controller 301, flash memory 302, an EPD 303, a wireless connectivity subsystem 304, a battery 305, and a power management block 306. Other example embodiments may have fewer or more modules, as will be appreciated. For instance, another example case may be implemented without the wireless connectivity subsystem 304 and the power management block 306. In addition, some modules shown as distinct and separate may alternatively be integrated with other modules, such as the controller 301 may be integrated with the SoC 300, and the flash memory 302 may be embedded in the controller 301. Also, although the techniques provided herein are particularly useful for mobile computing devices such as e-readers, tablets, and smartphones that are power constrained, there is no reason why the techniques provided herein cannot be used in conjunction with wired computing systems (no battery) as well. To this end, the EPD driving system depicted in FIG. 3, and further demonstrated in FIGS. 4-6*a*-*c*, can be included in or otherwise used with any type of computing device or system having an EPD or other integrating display that can benefit from the driving techniques provided herein.

The system of FIG. 3 is capable of updating the EPD 303 using only small kilobyte size memories (e.g., RAM or other suitable onboard memory) internal to both the SoC 300 and controller 301 by utilizing the flash memory 302 as both the display content source and working memory for the display update. To this end, note the memory 302 includes image data (e.g., current image and next image data structures), charge history (C.H.) data, and LUTs containing low bit count pulse width modulation (PWM) indices, generally referred to herein as playback files, and as will be explained in turn. Thus, no external DRAM (101, 201) is needed for the display update process.

Flash memory is generally much slower than RAM for both read and write operations. Flash memory is engineered for very high bit density (much higher than RAM, generally) and as a consequence has both a much lower cost per bit and much slower access time. For example, while DRAMs such as 101 and 201 of the respective systems shown in FIGS. 1 and 2 may be randomly accessed in 10's to 100's of nanoseconds, flash memory may take 10's to 100's of microseconds. Flash memory access is also highly asymmetric, in that write access is often significantly slower than read access (e.g., with a large latency of 100's of microseconds or even milliseconds) as a consequence of the non-volatile memory storage mechanism within the flash memory bit cells. Flash memory also has write endurance issues that limit the number of times a given bit cell can be written. To facilitate the integration of flash memory into mobile devices, the industry has evolved a set of standards for isolating some of the non-idealities of flash memory (e.g., poor write endurance, access latency) from the system software (e.g., OS) by integrating a flash management IC into the same chip package as the raw flash memory chips. Managed flash memory (e.g., embedded multimedia card flash standard, or eMMC) has become the workhorse of the mobile phone business as it implements such functions as wear leveling (to hide endurance problems), error correction, and caching, that allow flash to look more like an ideal (if slow) memory.

As will be appreciated in light of this disclosure, this increase in flash memory performance presents an opportunity to directly update a high resolution e-reader EPD by streaming the multi-frame data directly from flash memory. However, there are some non-trivial issues that remain. In more detail, and with reference to FIG. 2, a relatively simple implementation of direct-from-flash EPD update would relocate the input and output buffers of the conventional software EPD algorithms from DRAM 201 to flash memory 203. If the operating system needs for DRAM 201 can be similarly reduced, the opportunity exists to eliminate the DRAM 201 entirely from the system, saving substantial cost and removing the dominant drain on battery power. While advantageous in some regards, there is a strong downside to such a flash-only architecture. Since flash memory is substantially asymmetric on reads and writes, the simple implementation with reduced/eliminated RAM will generate such substantial flash write traffic that a flash based system would have an unacceptably long response time to user input.

As an example, an 800×600 EPD display has 480,000 pixels that are required to be refreshed at 85 Hz when the EPD image is changed in response to a button click. Including the typical requisite horizontal and vertical video blanking for this type display, the flash memory would need to supply data at a bandwidth of approximately 14 Mbytes per second, which is well within the capability of available managed flash (eMMC) devices. However, for a 40 frame transition (about 470 ms, typical of an e-reader page turn), a conventional architecture will require a 40 frame data structure of (480,000 pixels)*(2 bits per pixel)*(40 frames)=4.8 Mbytes be constructed in the flash by the update process. While the size and write bandwidth of this data structure is not a challenge for the comparatively rapid read/write of typical DRAM 201, a flash memory that is interleaving incremental source image read requests and output write requests will cause substantial slow down (e.g., more than a few seconds with typical eMMC performance) during the preparation of the 4.8 Mbytes of update frame buffers. This delay is would manifest as a user interface delay in many cases and is consequently unsatisfactory for e-reader products.

In contrast to the low performance brute force implementation described above, the present disclosure adopts an intermediate frame update representation that balances the read and write demands to more closely match and exploit the characteristics of the flash memory 302. A compact intermediate representation for the frame update is adopted that encodes the pixel driving waveforms into a series of multi-frame passes, wherein the update for a given pixel can be collectively encoded in the multi-frame passes in a relatively small number of bits to minimize both the necessary read and write buffer sizes and bandwidth. To this end, the controller 301 is configured to execute the methodologies provided with reference to FIGS. 4-6a-c, in conjunction with flash memory 302 and SoC 300. As will be appreciated in light of this disclosure, the controller 301 may be implemented, for example, with a field programmable gate array (FPGA) or other purpose-built hardware that is able to work without external RAM-based frame buffer(s) used in the comparative configurations shown in FIGS. 1 and 2. For instance, the controller 301 may be an integrated circuit custom built to carry out the various functionalities provided herein. Conventional logic programming and/or semiconductor fabrication techniques can be used to achieve this aim, as will be further appreciated. Each of SoC 300, controller 301, and flash memory 302 may be further serve additional purposes and otherwise be configured to carry other desired functionality, as will be appreciated in light of this disclosure. For instance, in addition to the functionality provided herein, SoC 300 may include a processor and implement any number of functions that SoC 100 and 200 might implement, and flash memory 302 can be used to store other data as well, such as digital content, operating system, and other code.

Methodology

Figure 4:
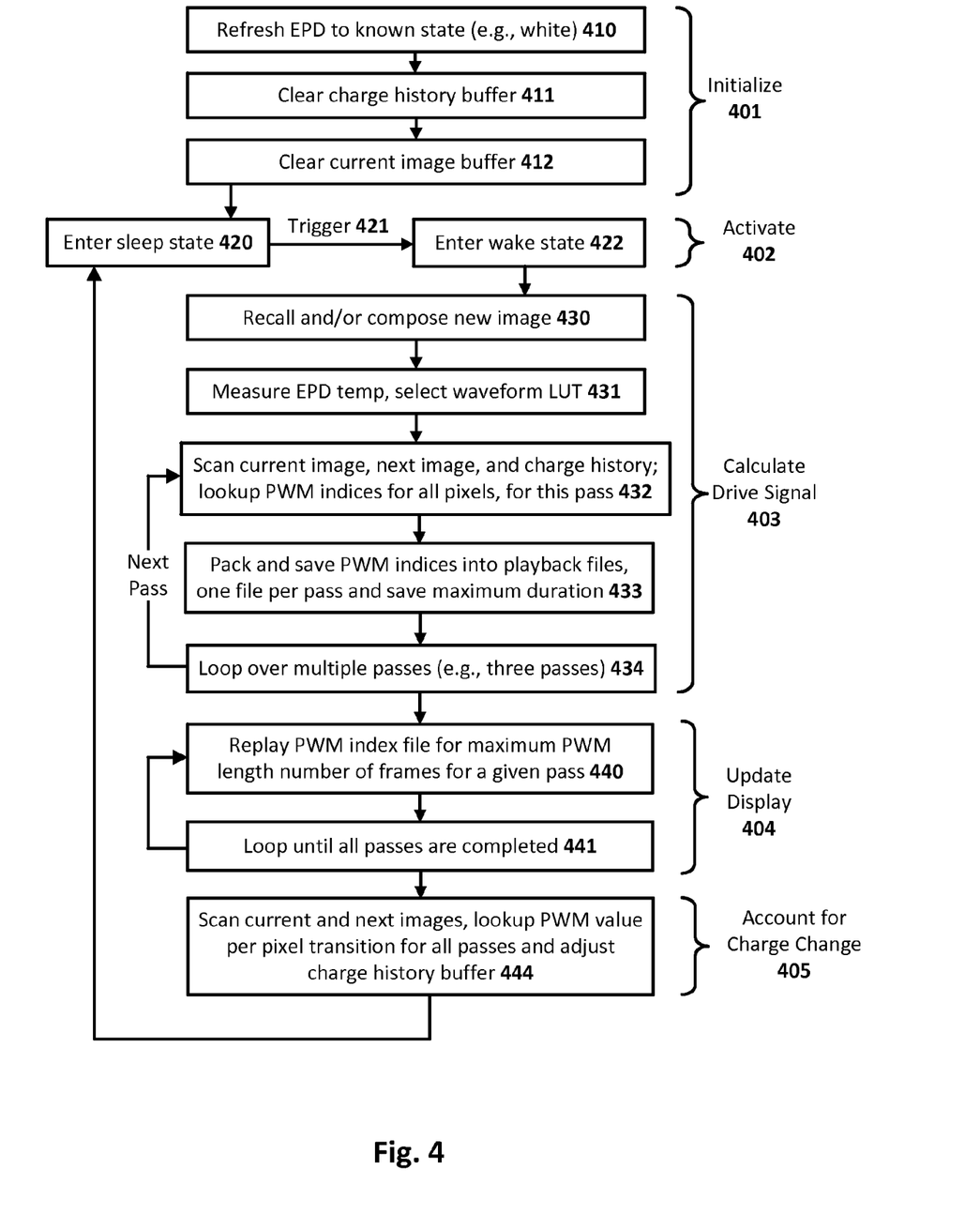
FIG. 4 illustrates a flowchart of an EPD image update process, in accordance with an embodiment of the present disclosure.

FIG. 4 illustrates a process for initializing the display update function and changing an image on the EPD 303, in accordance with an embodiment. As can be seen, the methodology can be executed by an EPD driving system and generally includes five main phases or functions, including initialize the EPD at 401, activate update process at 402, calculate drive signal at 403, update display at 404, and account for charge change at 405. Underlying details of each of these phases are described in turn, in accordance with various embodiments, and with further reference to the example embodiments of FIGS. 3, 5, and 6a-c.

In this example case, the SoC 300 first initializes the EPD 303 with a set of initialization operations indicated at 401. Starting from the assumption that the EPD display is in a state that is not known by the EPD driving system, the SoC 300 sends a command to the controller 301 to drive one or more known images to the screen at 410, typically all white or all black, to reset the EPD material 303 into an optically known state. A charge history buffer is constructed in memory in flash memory 302, or alternatively in the on-board memory (e.g., RAM) in the controller 301 or SoC 300, and cleared at 411. In addition, at 412, a buffer representing the current image is similarly constructed in flash memory 302 (or in the on-board memory of controller 301 or SoC 300) and set to a state that matches the clearing pattern applied at 410. At the end of the initialization sub-process 401, the charge history buffer is clear and the current image state is set both on the EPD 303 and in the flash memory 302 (or in the on-board memory of controller 301 or SoC 300).

At this point in the operation, the SoC 300 can enter into a sleep state at 420 and await a user or system generated trigger 421. As can be further seen, the EPD driving system is activated at 402 on receipt of a trigger 421 and the SoC 300 enters a wake state at 422 in preparation for an image update. Entry into the sleep state 420 and wake state 422 can be used to selectively power peripherals (e.g., by virtue of the power management block 306) in preparation for further action (e.g., a display update). Further note that the sleep state 420 and wake state 422 can be communicated to the controller 301 by the SoC 300, as needed (e.g., to initiate the calculation sub-process).

Calculate Drive Signal

When an image update is requested (e.g., in response to trigger 421, as reported by SoC 300), the controller 301 commences with calculation of the target drive signals at 403, wherein the required frame sequences to effect the image change from current to next image are determined. The calculation sub-process 403 begins with the recall and/or construction in flash memory 302 of the next image at 430, which may optionally involve the composition of images and other content into a new frame buffer. In accordance with one such embodiment, this process at 430 results in three input source data structures being stored in the flash memory 302, including a first data structure representing each pixel of the current image, a second data structure representing each pixel of the next image, and a third data structure representing the charge history that indicates how many positive and negative frames each pixel has been driven in its operating history. Although flash memory 302 is used in this example case, other embodiments may use a different memory available to the controller 301, if so desired (e.g., onboard memory or some other external memory). The temperature of the display is measured at 431, and this temperature measurement is used to select a particular waveform look-up table (LUT), or a set of LUTs as the case may be, that will be used to update the display. Such waveform tables can be tuned at the factory under varying temperature conditions to capture the response of the particular EPD material to electrical drive signals. In addition, waveform LUTs may be selected based on the desired transition type (e.g., fast direct transition with no flashing). In accordance with an embodiment, the waveform LUT is written by the SoC 300 into a small RAM table in the controller 301. In other embodiments, the waveform LUT can be stored externally to the controller 301, and accessed via the controller 301 using a suitable communication bus.

As can be seen at 432 in the example embodiment of FIG. 4, each of the input source data structures created at 430, representing the current image, the next image and the charge history, are scanned incrementally (from pixel to pixel) from flash memory 302 to form a waveform LUT index for each pixel. As can further be seen at 432, each waveform LUT index is then used to look-up a sequence of low bit count pulse width modulation (PWM) indices, which at 433 are subsequently packed and saved into a set of playback files stored in the flash memory 302. Further note in this example embodiment that there is one playback file per pixel per pass, and there is a maximum frame count per duration as well, as will be further explained with reference to FIGS. 6a-c. The number of passes to transition the display from the current image to the next image can vary from one embodiment to the next. Thus, and as indicated at 434, the scanning/look-up at 432 and pack/saving at 433 can be repeated as needed for each pass. This scanning process (432, 433, 434) can be carried out in its entirety by the controller 301, in accordance with an embodiment. Variations on the methodology will be apparent. In one embodiment, the input source data structures are scanned multiple times, once for each output pass as shown at 432, 433 and 434. In an alternative embodiment, the input source data structures are scanned once and multiple output files (one for each pass) are created in parallel, using buffer memories in controller 301 to pack intermediate results for writing to flash memory 302. In either case, the resulting packed PWM index files can be arranged preferentially to allow fast recall from the flash memory 302, in accordance with an embodiment and as will be appreciated in light of this disclosure.

Figure 5:
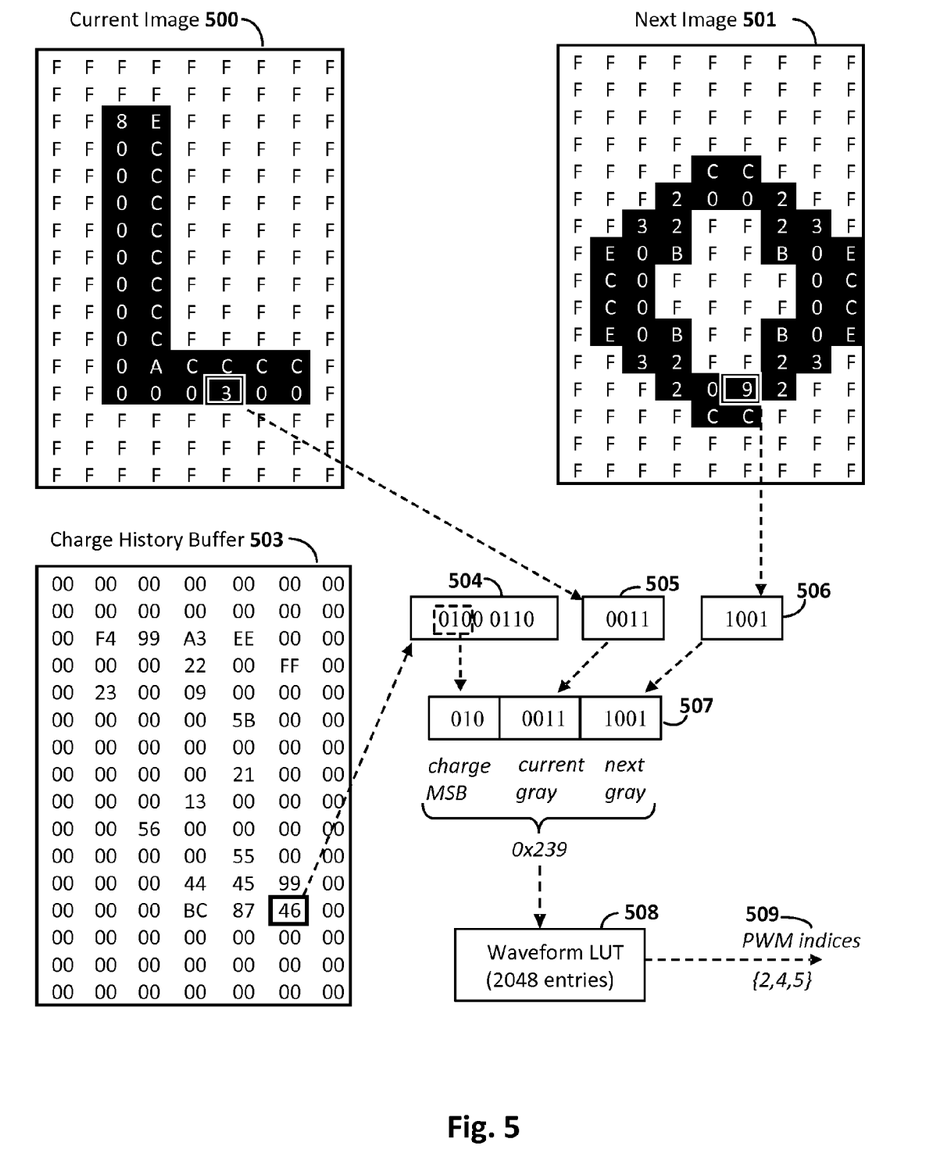
FIG. 5 shows a representative example of an image and charge data flow for calculating a drive signal for the calculating process shown in FIG. 4, in accordance with an embodiment of the present disclosure.

An example of this sub-process 403 for calculating the EPD update frames is shown in FIG. 5, in accordance with one embodiment. As can be seen, three input bitmap data structures are scanned sequentially—a bitmap memory buffer of the current image 500 (shown with a 4-bit per pixel representation of a letter "L"), a bitmap memory buffer of the desired next image 501 (shown with a 4-bit per pixel representation of the letter "o"), and a charge history buffer 503. In this example configuration, the charge history buffer 503 contains an 8-bit value per pixel that indicates how many positive and negative frames the corresponding pixel has been driven in its operating history. An 8-bit value can, in accordance with one example embodiment, use a 2's complement representation to encode values from −128 to +127 frames of historical DC imbalance. As previously explained with reference to 432 through 434 of FIG. 4, the three input bitmap data structures 500, 501, and 503 can be scanned from flash 302 by controller 301 to identify an index value that is in turn used to look-up a set of PWM indices (one PWM index per pass in the multi-pass display update process). Continuing with the example shown in FIG. 5, the three per-pixel input data sources are accessed sequentially. In particular, in the targeted pixel position of FIG. 5 (as indicated with boxes in each bitmap), the current image 500 (the "L") has a value of 3, the next (desired) image 501 pixel has a value of 9, and the charge history buffer 503 has a value of hex 0x46.

As can be further seen in this example embodiment of FIG. 5, the three data values per pixel, depicted in binary at 504, 505, and 506, are concatenated together to form a look-up index 507 into the waveform LUT 508. The LUT 508 may be implemented, for example, with RAM within controller 301. In order to reduce the size of the waveform LUT 508, the concatenated look-up index 507 contains only a few of the most significant bits (MSBs) of the charge history buffer value 504, in accordance with an embodiment. In this particular example, the top three MSBs of the charge history buffer value 504 are used for concatenation 507. So, 505 shows the binary value (0011) of the target pixel from the current image 500, 506 shows the binary value (1001) of that target pixel from the next image 501, and 505 shows a portion of the binary value (010; top three MSBs) of the target pixel from the charge history 503. In this way, a look-up index 507 is formed that contains information about the corresponding pixel, including charge history, the current state, and the desired next state. In other embodiments, the charge history is optional wherein the look-up index is derived from only the current and next images 500 and 501, respectively, or alternatively may contribute fewer or more bits to the look-up index 507.

As can be further seen in the specific example of FIG. 5, the index formation process results in a concatenated look-up value of hex 0x239 for this particular pixel. Further note in this example embodiment that the waveform LUT 508 will have 2048 entries to handle all combinations of the 11-bit look-up index. Specifically, four bits from the target pixel of current image 500, plus four bits from that same pixel of next image 501, plus three bits from the charge history buffer 503 for that same pixel, equals eleven bits total, which in turn allows for 2048 distinct entries in waveform LUT 508. Further note in the example embodiment depicted in FIG. 5 that each entry of the LUT 508 contains a sequence of low bit count PWM indices 509. Continuing with the example case, a look-up value of hex 0x239 corresponds to an entry in LUT 508 having PWM indices 2, 4, 5 (depicted at 509). As will be appreciated in light of this disclosure, and with reference FIG. 6a, each PWM index of 509 corresponds to a corresponding PWM LUT 607a-c.

Figure 6A:
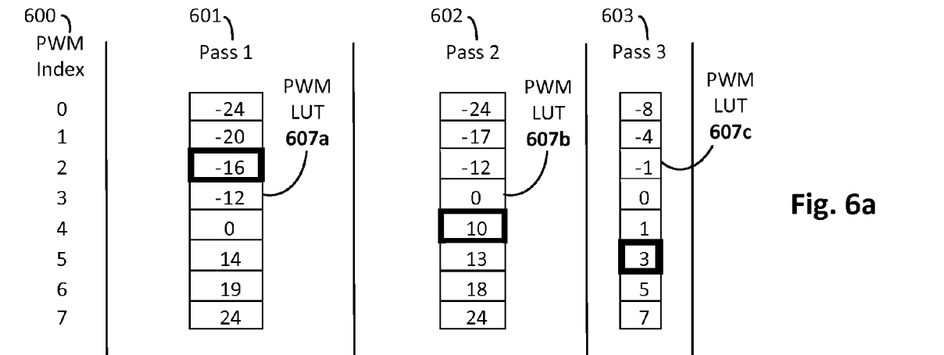
FIGS. 6a-c collectively show a representative example of the display update process shown in FIG. 4, in accordance with an embodiment of the present disclosure.

In more detail, and as shown in the example embodiment depicted in FIG. 6a, each waveform LUT entry 508 contains three 3-bit values (for a total of 9 bits) of packed PWM indices. These 3-bit indices represent a discrete set of polarities and/or durations of the electrical drive signal to be applied to a given pixel over the course of a multi-pass update. Thus, the resulting waveform LUT index computed at 432 is used to access the LUT 508 to identify the corresponding PWM indices 509, which at 433 are then packed or otherwise stored by the controller 301 in flash 302 as a set of playback files. There is one playback file per pixel per pass, according to an embodiment, where each PWM index corresponds to one pass, so the process can be repeated for each pass as previously explained with respect to 434.

FIG. 6a shows one specific example embodiment where there are three PWM indices 509 recalled from the waveform LUT 508, and which correspond to the PWM index 600 (i.e., PWM indices 2, 4, and 5 identified at 509 correspond to indices 2, 4, and 5, respectively, of the PWM index 600). To this end, the three PWM indices collectively encode a three pass frame update process, and where the first pass 601 allows eight different duration/polarity combinations ranging from negative polarity for 24 frames (corresponding to a PWM index 600 value of 0) to positive polarity for 24 frames (corresponding to a PWM index 600 value of 7). As can be further seen in FIG. 6a, two additional passes (602 and 603) have potentially different encodings and ranges. So, with further reference to the example shown in FIGS. 5 and 6a, the result of the waveform LUT 508 look-up of hex value 0x239 results in a multi-pass triplet of {2,4,5}, which in turn encodes a polarity sequence of {-16, 10 and 3} for the three passes as highlighted in FIG. 6a. As previously explained with respect to the calculate drive signal process 403 of FIG. 4, the three PWM indices 509 {2,4,5} identified by the look-up at 432 for the given pixel, along with the three PWM indices 509 for each of the other pixels, can be efficiently packed or otherwise saved into playback files at 433, one file per pass, along with the maximum duration or frame count for each pass (over all pixels).

In the example embodiment shown in FIG. 6a, the multi-pass waveform update process includes three passes and is constructed to progress from a coarse and large amplitude table 607a as shown in the first pass 601 to a set of progressively finer and smaller amplitude tables (607b and 607c) in the second and third passes (602 and 603). As will be appreciated in light of this disclosure, the evolution from coarse grain to fine grain supports driving the EPD pixel hard into saturation (black or white) in the first pass, which only requires coarse precision, and then setting the desired final gray shade in the later passes with higher precision given by fine grain steps. In this embodiment, a compact encoding (9 bits total=512 possible waveform combinations) can represent a wide range of transitions from a given gray level to another as well as give a wide range of charge correction (positive, negative, of varying amplitudes) to incrementally restore charge balance to the display.

The selection of the values of these encodings can be dependent on many factors, including but not limited to the temperature of the display, the desired optical effect (e.g., low ghosting on white background, better grayscale accuracy near black, and other such effects), the desired response time, the desired charge corrective ability and range, and other pertinent factors. As will be further appreciated in light of this disclosure, these considerations and optimizations can be captured in the combination of the waveform LUT 508 and the PWM LUTs 607, of which there are three in this example case (607a-c), each PWM LUT 607 having eight entries. To this end, note that LUTs 508 and 607a-c can be preferentially determined at or before manufacturing time based on empirical measurements of the optical response of the EPD material to the possible electrical waveform patterns to achieve a high quality image rendering on the EPD, in accordance with an embodiment. In other embodiments, LUTs 508 and 607a-c can be determined based on theoretical performance of the optical response of the EPD material to the possible electrical waveform patterns to achieve a high quality image rendering on the EPD, or a combination of such theoretical performance and empirical measurements, as will be appreciated.

Further note that the compact encodings of the PWM LUTs 607a-c may be bipolar or unipolar in each respective pass and/or may have more or fewer bits per pass; the generality of the present disclosure is not dependent on the particular choice of LUT contents or bit depths. Similarly the scanning order of the input or output data sources need not proceed sequentially to implement an embodiment of the present disclosure; such general transpositions and re-orderings do not alter the scope of the present disclosure.

As will be further appreciated in light of this disclosure, the compact intermediate PWM encoding of the present disclosure (in this example embodiment, 3 bits per pixel per pass) creates a major reduction in the write bandwidth when constructing the update. In particular, instead of 2 bits per pixel to encode +V, −V or 0V per pixel with, for example, 40 unique frames in a conventional update construction method (totaling 80 bits per pixel to be stored and read back from memory), a 3 bit per pixel representation of three passes requires only 9 bits per pixel to encode the entire transition. This more compact data structure (on the order of $1/10^{th}$ the size, depending on the update length) results in a significant speed-up in the waveform compilation process since the number of writes to flash memory 302 (which dominate the execution time) are substantially reduced.

One consequence of a compact intermediate representation of PWM encoding according to an embodiment is that the playback time read bandwidth demands on the flash memory 302 are increased, in this example by a factor of 50% (from 2-bpp to 3-bpp). Due to the asymmetric performance of flash memory to reads and writes (with reads being substantially faster), this increase in performance is readily handled by conventional flash memory architectures. By minimizing the write bandwidth requirements without bloating the read bandwidth requirements out of the range of available flash memories, the architecture of the present disclosure makes it possible to manufacture a very low cost and power efficient EPD e-reader that can be directly run from flash memory without a need for large buffer RAMs in either the processor of the SoC 300 (or elsewhere in SoC 300), the controller 301, or elsewhere in the display driver system.

Maximum Frame Count. During the calculation sub-process 403, the maximum frame count of the selected PWM indices (e.g., up to 24 frames in the table shown in FIG. 6a for the first pass 601) are recorded for each pass for all pixels on the display. In total, in this example embodiment, three maximum frame counts are recorded, one for each pass; for the purposes of furthering the example of FIGS. 5 and 6a-c, assume the three maximum pass durations are 19 frames, 18 frames, and 8 frames for the first (601), second (602), and third (603) passes, respectively. As will be appreciated, the maximum frame counts will vary, depending on factors such as the degree of difference between the current and next image for any given pixel of the display.

Update Display with Computed Drive Signal

Figure 6B:
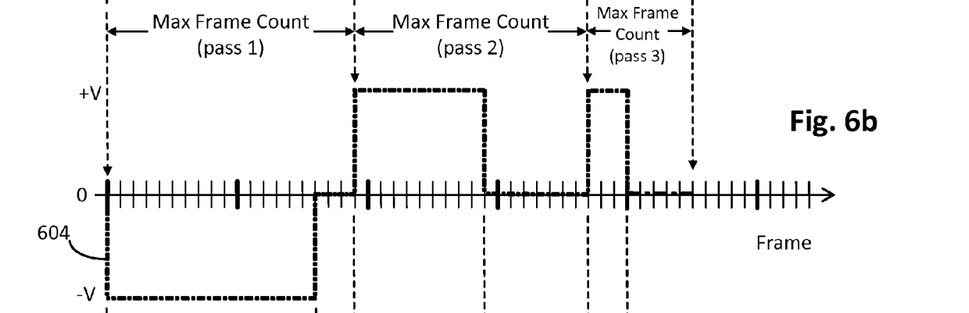

Now, with further reference back to FIG. 4, after the calculation sub-process 403 is carried out, the display can then be updated as shown at sub-process 404. In particular, the sub-process proceeds at 440 to replay the PWM index file for the maximum PWM length number of frames for a given pass, and loops until all passes are completed, as indicated at 441. In more detail, and with further reference to the example embodiment of FIGS. 5 and 6a-c, for each pass the corresponding PWM index file 509 saved to flash memory 302 at 433 is repeatedly scanned in its entirety, thereby generating a stream of 3-bpp look-up values that are then used to determine, with a frame counter, whether a given pixel should be driven with +V, −V or 0V for a given frame. In this example embodiment, note that the non-zero pulse width values are driven immediately in the first frame. So, for example, if the PWM index 509 looks up a negative polarity duration of 16 frames as shown in first past 601, the system outputs a −V value for that pixel for 16 frames, starting with the first frame of the first pass 601, as shown in FIG. 6b. In addition, for a given pixel whose PWM duration is less than the maximum PWM duration (referred as Max Frame Count in FIG. 6b) of that pass (across all pixels), further note that the pixel is driven to 0V for the remaining frames of the first pass which causes the EPD material to arrest its optical transition. So, with reference to the example shown in FIG. 6b, the maximum frame count for the first pass 601 is 19 frames, and the subject pixel is driven for 16 frames at −V and at 0V for the remaining 3 frames. Once all of the pixels in the array have been driven with the appropriate width +V or −V signals for that pass, the system will advance to processing the next pass, and so on, until all passes are concluded. To this end, the maximum frame count for the second pass 602 is 18 frames, and the subject pixel is driven for 10 frames at +V and at 0V for the remaining 8 frames. As can be further seen, the maximum frame count for the third pass 603 is 8 frames, and the subject pixel is driven for 3 frames at +V and at 0V for the remaining 5 frames. As will be appreciated, the polarities provided in the examples include +V, −V and 0V, but other embodiments may include polarities around some other neutral value which need not necessarily be 0V.

Variations will be apparent in light of this disclosure. For instance, in an alternative embodiment, the driving process may defer the driving of a pixel to later in the pass if the pixel pulse width has a shorter duration than a current duration of the pass (so as to sequentially drive pixels in an ordered fashion based on pixel pulse widths ordered from longest to shortest duration). In another alternative embodiment, the update waveform may be padded with fixed prefix or suffix frames to, for example, achieve a more uniform driving experience by "rattling" the EPD between +V and −V. In another alternative embodiment, the PWM pulses may be selectively dithered within the given pass to smooth the transitions. In one particular embodiment, the passes are kept as short as possible to minimize the overall update time (sum of all passes, in frames). Additionally, in one such embodiment and as previously discussed above, the PWM drive commences at time $t_0$ (start time of a given pass) or otherwise as soon as possible in the corresponding pass (as shown in FIG. 6b) so that the EPD transition is as fast (early) as possible.

With further reference to FIG. 6b, the electrical drive signal 604 for the example pixel of the multi-pass playback is shown. In this example, the longest duration PWM across all pixels in the first pass 601 is 19 frames; thus the controller 301 will scan the entire first playback buffer 19 times (once per output frame at, for example, an 85 Hz frame rate) until all pixels for that pass 601 have completed their respective pulse durations as specified by their corresponding 3-bit PWM index values 509 that were looked up from the waveform LUT 508 in the calculation at 432 and stored in the replay files at 433. Thus, the dashed line of 604, which represents the pixel voltage, of the example in FIGS. 5 and 6a-c is driven to −V for 16 frames. As previously explained, in this example embodiment, the subject pixel is driven to 0V for the remaining 3 frames of the first pass. Due to the integrating nature of the EPD material, the extra frames of 0V drive appended to the end of the PWM waveform of the first pass 600 can be arbitrarily long with little effect on the grayscale of the pixel. In some embodiments, if an entire pass is known to have values that correspond to zero length PWM values, the particular pass can be preferentially skipped (i.e., no reads of the playback file for that pass) to minimize the overall EPD update duration.

With further reference to the example of FIGS. 5 and 6a-c, the second pass 602 has a maximum duration or frame count across all pixels of 18 frames; the particular pixel shown has a positive duration of 10 frames during this 18 frame pass. On the last (third) pass 603, the maximum frame count shown in this example is 8 frames (again, across all pixels on the display) and this particular pixel has a 3 frame duration. Overall, the multi-pass duration for this example is 19+18+8=45 frames.

Figure 6C:
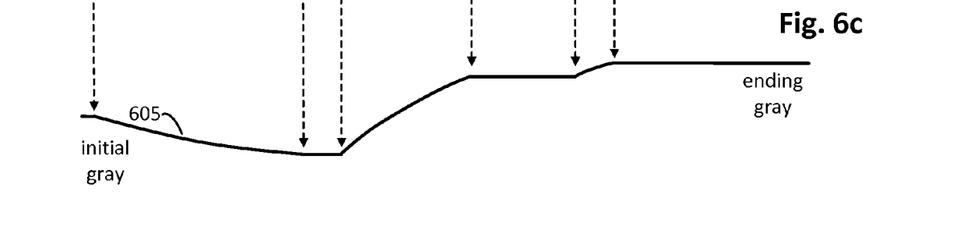

So in this example case, a multipart drive signal 604 is applied in corresponding multiple passes, wherein the first part of the drive signal is 19 frames long (for first pass 601), the second part is 18 frames long (for second pass 602), and the third part is 8 frames long (for third pass 603). The polarity and duration of that polarity associated with each portion of the multipart drive signal 604 are indicated in the LUTs 607a-c. For a given pixel, and for any portion of the maximum frame count for a given pass (across all pixels) not indicated to be at the polarity, the polarity can be set to 0V. Numerous variations will be apparent in light of this disclosure.

An approximate optical response 605 of the EPD material is shown in FIG. 6c. The EPD electro-optical response is often non-linear (soft saturating) and asymmetric (i.e., it takes more frames to drive a dark pixel blacker than to drive a white pixel similarly blacker). As can be seen, the optical response starts at an initial condition that approximately corresponds to the gray level of the current pixel, which in this example is a gray level of 3 in a 4-bit gray scale, as show in FIG. 5. The first pass 601 consists of a 16 frame negative driving cycle for this example pixel, causing the optical response to asymptotically approach black. In the second pass 602, the electrical drive signal is a 10 frame positive sequence, causing the optical response to rise from black rapidly and settle at a mid-gray level. The final phase or pass 603 for this example update of an example pixel is a positive 3 frame update that creates a small adjustment towards white to reach the final desired gray shade, which in this example is a gray level of 9 in a 4-bit gray scale, as show in FIG. 5.

Charge History Updating

With further reference back to FIG. 4, the methodology continues at 405 with accounting for charge change per pixel. In the example case shown, this is accomplished at 444 by scanning the current and next images, and performing a lookup to identify the PWM value per pixel transition for all passes, and then adjust the charge history buffer accordingly. In more detail, and with reference to the example pixel drive sequence shown in FIGS. 5 and 6a-c, the target pixel was driven a total of 16 frames at −V and 13 frames at +V, leading to a cumulative DC imbalance of −3 frames. This DC effect is accounted for at 405. In this charge accounting sub-process 405, the input images (both current image 500 and next image 501) as well as the charge history buffer 503 are re-scanned and the cumulative DC drive imbalance (for this pixel in this example, −3 frames) is added to that pixel in the charge history buffer 503. In this example for this pixel, the charge history buffer 503 started at hex 0x46; in sub-process 405 this pixel would be adjusted to hex 0x43 (0x46+−0x03=0x43). By recording the drive history of the pixels in an 8-bit value and using this information (at least the MSBs) to derive update waveforms in the next image update, a feedback system is formed that allows a large sequence of image updates (e.g., flipping pages in an e-book) to correct the DC imbalance towards neutral (e.g., 0 frames of imbalance) incrementally.

In some embodiments, the sub-process to account for charge change at 405 is done following the display update sub-process 404, since 405 takes non-zero time and, if placed before the display update 404 may introduce latency. However, a number of alternative embodiments generally reordering and/or inserting additional steps (e.g., delays, pre-computing likely transitions, caching, and other desired processing) will be apparent in light of this disclosure. For example, the accounting for charge change at 405 can be performed before the display update 404 or before the calculation sub-process 403. Furthermore, the calculation sub-process 403 can be performed speculatively before the device enters sleep state 420 for one or more common or otherwise anticipated transitions (e.g., the next page in the book) and cached in flash memory 302 (or other accessible memory). Thus, upon a trigger 421, the system can perform a check to determine whether the trigger 421 is consistent with a pre-computed and cached calculation 403 and, if so, jump directly to the display update at 404 to minimize the delay from trigger 421 to display update for high probability page transitions. Such modifications to the ordering of the methodology functions or phases, the inclusion of new steps, and the addition of new memory structures for intermediate results are all intended to be within the scope of the present disclosure. In some example embodiments, the charge buffer adjustment at 405 is performed in a way that the output result will saturate or clip on overflow. For example, in the 8-bit charge history buffer example shown in FIGS. 5 and 6a-c with 2's complement representation of the charge history at 503, any adjustments that would result in a charge buffer value of less than −128 frames would clip at −128 frames; similarly, any adjustments that would result in a charge buffer value of greater than +127 frames would clip at +127 frames.

A number of additional features and benefits will be apparent in light of this disclosure. For instance, and in accordance with some embodiments, the set of playback buffers created at 433 can be designed to have substantially fewer bits per pixel than the source information to better match the read and write bandwidth available with flash memory 302 while both calculating the drive signal at 403 and driving the display at 404. For example, in one example embodiment, assume there are three playback buffers with 3-bpp each that are derived from a 4-bpp current image, a 4-bpp next image, and an 8-bpp charge accumulation buffer (totaling 16-bpp of information input). This compaction from 16-bpp of input to three phases of 3-bpp each (9-bpp total write and 3-bpp read while driving) has a number of favorable benefits. By keeping the intermediate playback buffers relatively compact, the write bandwidth limitations of flash do not dominate latency. For example, an 800×600 pixel frame size at 3-bpp leads to a playback buffer size of 180 kbytes total, which can be written reasonably quickly to currently available flash memories. By introducing an intermediate format between input sources and output drive in accordance with an embodiment, the read and write bandwidth limitations of the main system memory (in this case flash) are effectively rebalanced. A more brute force approach (e.g., for a transition that requires 40 frames, storing 2-bpp for every frame results in an 80-bpp temporary file) can lead to a write requirement approximately 9 times larger than that of the present disclosure which is poorly matched to flash memory performance due to its slower write capability. During the playback/scanning of these files during the display update sub-process at 404, the slightly increased read bandwidth requirements according to an embodiment (growing to 3-bpp versus the 2-bpp of the brute force approach) are well within the read bandwidth limits of present flash memories.

Example Benefits and Advantages

Numerous benefits and advantages will be apparent in light of this disclosure. Example such benefits and advantages are provided herein in the context of one or more embodiments. However, further note that some embodiments may not have all or any such benefits and advantages, and still fall within the scope and spirit of this disclosure. To this end, and in accordance with an embodiment, the techniques provided herein can be used to provide an EPD driving system that tracks the per-pixel charge history of the EPD material to preserve DC charge balance, over the life of the display. In an embodiment, the techniques provided herein can be used to provide an EPD driving system that compiles the current image, the desired next image, and the charge history buffer into a series of compact files for future replay to an EPD. Another example embodiment provides a method for compiling a previous image, a new image and a charge history buffer into a series of compact files using a look-up table that represents the electro-optic behavior of the EPD from a given batch (of electronic ink, and the corresponding display manufacturing process) and/or at a given temperature. As will be further appreciated, the techniques provided herein can be further used to provide an EPD driving system that reduces the bandwidth requirements of a display controller's main memory, in accordance with an embodiment. The techniques may be useful, for instance, in implementing relatively low cost EPD readers and other EPD devices. For example, the electrical component costs may be approximately cut in half compared to a typical Android or Linux based EPD reader. An additional benefit may be that power consumption of an EPD-based device configured in accordance with an embodiment is substantially reduced (e.g., up to 80%), thereby enabling new designs that harvest ambient energy (e.g., indoor solar power) and do not require conventional charging ports, cables, or adapters.

In general, prior EPD-based e-readers use random access memory (RAM) based systems and smartphone-like operating systems to control the EPD display. For instance, one example configuration employs a software controller and an Android-based operating system which has the downside of requiring external double data rate dynamic random-access memory (DDR DRAM) for main memory and EPD updates. The implications of this external DRAM and heavyweight OS is that the EPD reader cannot get into a deep sleep state without having a very impactful wait (e.g., 30 sec~1 min to boot the system from deep sleep). As a result, despite the zero-power nature of electrophoretic displays, such EPD readers allocate around 75% of their total battery power to an idle state that is spent keeping the operating system awake enough to be sufficiently responsive to the user. To this end, an embodiment of the present disclosure eliminates the need for external DRAM from the EPD update process, trades a software-based EPD controller (typically provided by an electronic ink supplier) for a purpose-built hardware based controller (e.g., field programmable gate array, or FPGA), which in turn offloads processor burden thereby allowing for a lower cost central processor. For instance, rather than use an 800 MHz Cortex-A8 processor running Linux/Android in an EPD-based reader, a much lower power and lower cost 32 MHz Cortex-M3 can be used (with less than 1% of the compute horsepower).

Thus, an embodiment according to the present disclosure includes a method for compiling an image update in FPGA logic that is able to work without a RAM-based frame buffer(s). Rather, the frame buffer(s), which are generally required for EPD grayscale operation, are instead stored in relatively lower cost flash memory (e.g., eMMC, aka managed NAND flash memory, or other comparable memory). As will be further appreciated in light of this disclosure, the use of flash memory for a frame buffer implies some unusual constraints due to the unequal read/write bandwidths of flash (reads are often 5× to 10× faster than writes). The present disclosure provides a method, according to one specific example embodiment, to first compile the desired image change into a set of relatively compact files in an eMMC flash memory (writing each once), then secondly updating the display by replaying these files multiple times each as required (one file is played back to the EPD per output frame at somewhere between 10 ms and 20 ms per frame, at 85 Hz) until the sequences complete and the image update is accomplished (e.g., around 500 ms in total). Compared to a RAM-based EPD system, the bandwidth requirements to memory are substantially reduced according to an embodiment of the present disclosure, such that RAM can be eliminated and flash used instead, thereby saving power, cost, and board area, as well as reducing software complexity.

With over a billion smartphones deployed and a growth/replacement cycle that shows no signs of abating, the prevalence of mobile phones and cloud platforms with significant computing capabilities has opened new opportunities to craft hardware devices that can leverage these resources, as will be appreciated in light of this disclosure. The so-called Internet-of-things and wearable technologies are two categories of devices that either directly or indirectly rely on the average user having a smartphone nearby to control, configure, monitor, and interact with cloud services linked to such accessory devices. It is in this spirit and context that the present disclosure is provided.

Numerous variations and configurations will be apparent in light of this disclosure. For example, one example embodiment of the present disclosure provides a display driving system. The system includes a memory and a controller. The memory is configured to store a first memory structure containing a representation of a current optical state of a display, a second memory structure containing a representation of a next optical state of the display, and a third memory structure containing a look-up table that encodes each of a plurality of sets of electrical drive signals in an intermediate representation. The controller is configured to combine content of the first memory structure with content of the second memory structure to form an index, use the index to look-up an intermediate representation of a target set of electrical drive signals in the look-up table, and drive the display based at least in part on the target set of electrical drive signals, thereby updating the display from the current optical state to the next optical state. In some cases, the memory is further configured to store an additional memory structure containing a cumulative charge history of drive signals applied to the display. In one such case, the controller is further configured to use at least partial content of the additional memory structure to form the index. In another such case, the controller is further configured to update the additional memory structure each time the display is updated, so as to maintain the cumulative charge history. In some cases, the target set of electrical drive signals forms a multipart drive signal, and the intermediate representation of the target set of electrical drive signals includes a plurality of look-up table indices, each look-up table index indicating a polarity and duration for a distinct part of the multipart drive signal to be applied to the display in corresponding distinct passes, thereby providing a multi-pass display update process. In one such case, the multi-pass display update process includes three passes, each distinct pass corresponding to a distinct part of the multipart drive signal. In some cases, the controller is configured to form an index for each of at least multiple pixels of the display, and to use each of those indices to look-up a corresponding intermediate representation of a target set of electrical drive signals for the associated pixel, and to drive the display based at least in part on each target set of electrical drive signals. In some cases, the memory comprises flash memory. In some cases, the display is an electrophoretic display. Variations will be apparent. For instance, another embodiment provides a mobile computing device that includes the display driving system as variously defined in this paragraph. In some such cases, the mobile computing device is an e-reader or tablet computer.

Another example embodiment of the present disclosure provides an electrophoretic display driving system. The system includes a flash memory and a controller. The flash memory is configured to store a first memory structure containing a representation of a current optical state of a display, a second memory structure containing a representation of a next optical state of the display, and a third memory structure containing a look-up table that encodes each of a plurality of multipart drive signals in an intermediate representation. The controller is configured to combine content of the first and second memory structures to form an index, and use the index to look-up an intermediate representation of a target multipart drive signal in the look-up table, wherein the intermediate representation includes a plurality of look-up table indices, each look-up table index associated with a polarity and duration for a distinct part of the target multipart drive signal to be applied to the display in corresponding distinct passes, thereby providing a multi-pass display update process. The controller is further configured to drive the display based at least in part on the target multipart drive signal, thereby updating the display from the current optical state to the next optical state. In some cases, the controller is configured to form an index for each of at least multiple pixels of the display, and to use each of those indices to look-up a corresponding intermediate representation of a target multipart drive signal for the associated pixel, and to drive the display based at least in part on each target multipart drive signal. Another example embodiment provides a mobile computing device (e.g., tablet, e-reader, smartphone) that includes the display driving system as variously defined in this paragraph.

Another example embodiment of the present disclosure provides an electrophoretic display driving system. The system includes a flash memory and a controller. The flash memory is configured to store a first memory structure containing a representation of a current optical state of a display, a second memory structure containing a representation of a next optical state of the display, a third memory structure containing a cumulative charge history of drive signals applied to the display, and a fourth memory structure containing a look-up table that encodes a set of electrical drive signals in an intermediate representation. The controller is configured to combine content of the first, second, third and fourth memory structures to form an index for accessing the look-up table, and use the index to look-up the intermediate representation of the set of electrical drive signals in the look-up table, wherein the intermediate representation comprises a plurality of look-up table indices, each look-up table index associated with drive signal polarity and duration to be applied to the display in distinct passes, thereby providing a multi-pass display update process. The controller is further configured to drive the display based at least in part on the set of electrical drive signals, thereby updating the display from the current optical state to the next optical state. In some cases, the controller is further configured to update the third memory structure each time the display is updated, so as to maintain the cumulative charge history. In some cases, the controller is configured to form an index for each of at least multiple pixels of the display, and to use each of those indices to look-up a corresponding intermediate representation of a set of electrical drive signals for the associated pixel, and to drive the display based at least in part on each set of electrical drive signals. In some cases, each pass of the multi-pass display update process is associated with a maximum frame count with respect to all pixels, and in response to the drive signal duration for a given pixel and a given pass being less than the maximum frame count, the controller is further configured to set the drive signal polarity to a neutral value for any remaining frames of that pass until the maximum frame count is reached. In some cases, the controller is further configured to commence the drive signal polarity at the beginning of a given pass rather than later in a given pass. Another example embodiment provides a mobile computing device that includes the display driving system as variously defined in this paragraph.

The foregoing description of the embodiments of the disclosure has been presented for the purposes of illustration and description. It is not intended to be exhaustive or to limit the present disclosure to the precise form disclosed. Many modifications and variations are possible in light of this disclosure. It is intended that the scope of the present disclosure be limited not by this detailed description, but rather by the claims appended hereto.

What is claimed is:

1. A display driving system, comprising:
    a memory configured to store:
        a first memory structure containing a representation of a current optical state of a display;
        a second memory structure containing a representation of a next optical state of the display; and
        a third memory structure containing a look-up table that encodes a target set of electrical drive signals in an intermediate representation for transitioning the display from the current optical state to the next optical state, the target set of electrical drive signals forming a multipart drive signal, and the intermediate representation of the target set of electrical drive signals includes a plurality of look-up table indices, each look-up table index indicating a polarity and duration for a distinct part of the multipart drive signal to be applied to the display in three distinct passes, wherein each distinct pass corresponds to a distinct part of the multipart drive signal, thereby providing a multi-pass display update process; and
    a controller configured to:
        combine content of the first memory structure with content of the second memory structure to form an index;
        use the index to look-up the intermediate representation of the target set of electrical drive signals in the look-up table; and
        drive the display based at least in part on the target set of electrical drive signals, thereby updating the display from the current optical state to the next optical state.

2. The display driving system of claim 1 wherein the memory is further configured to store an additional memory structure containing a cumulative charge history of drive signals applied to the display.

3. The display driving system of claim 2 wherein the controller is further configured to use at least partial content of the additional memory structure to form the index.

4. The display driving system of claim 2 wherein the controller is further configured to update the additional memory structure each time the display is updated, so as to maintain the cumulative charge history.

5. The display driving system of claim 1 wherein the controller is configured to form an index for each of at least multiple pixels of the display, and to use each of those indices to look-up a corresponding intermediate representation of a target set of electrical drive signals for an associated pixel, and to drive the display based at least in part on each target set of electrical drive signals.

6. The display driving system of claim 1 wherein the memory comprises flash memory.

7. The display driving system of claim 1 wherein the display is an electrophoretic display.

8. A mobile computing device comprising the display driving system of claim 1.

9. The mobile computing device of claim 8 wherein the mobile computing device is an e-reader or tablet computer.

10. An electrophoretic display driving system, comprising:
a flash memory configured to store:
a first memory structure containing a representation of a current optical state of a display;
a second memory structure containing a representation of a next optical state of the display; and
a third memory structure containing a look-up table that encodes a target multipart drive signal in an intermediate representation for transitioning the display from the current optical state to the next optical state, the intermediate representation of the target multipart drive signal includes a plurality of look-up table indices, each look-up table index indicating a polarity and duration for a distinct part of the target multipart drive signal to be applied to the display in three distinct passes, wherein each distinct pass corresponds to a distinct part of the multipart drive signal, thereby providing a multi-pass display update process; and
a controller configured to:
combine content of the first and second memory structures to form an index;
use the index to look-up the intermediate representation of the target multipart drive signal in the look-up table, wherein the intermediate representation comprises a plurality of look-up table indices, each look-up table index associated with a polarity and duration for a distinct part of the target multipart drive signal to be applied to the display in corresponding distinct passes, thereby providing a multi-pass display update process; and
drive the display based at least in part on the target multipart drive signal, thereby updating the display from the current optical state to the next optical state.

11. The display driving system of claim 10 wherein the controller is configured to form an index for each of at least multiple pixels of the display, and to use each of those indices to look-up a corresponding intermediate representation of a target multipart drive signal for an associated pixel, and to drive the display based at least in part on each target multipart drive signal.

12. A mobile computing device comprising the display driving system of claim 10.

13. An electrophoretic display driving system, comprising:
a flash memory configured to store:
a first memory structure containing a representation of a current optical state of a display;
a second memory structure containing a representation of a next optical state of the display;
a third memory structure containing a cumulative charge history of drive signals applied to the display; and
a fourth memory structure containing a look-up table that encodes a set of electrical drive signals in an intermediate representation for transitioning the display from the current optical state to the next optical state, the set of electrical drive signals forming a multipart drive signal, and the intermediate representation of the set of electrical drive signals includes a plurality of look-up table indices, each look-up table index indicating a polarity and duration for a distinct part of the multipart drive signal to be applied to the display in three distinct passes, wherein each distinct pass corresponds to a distinct part of the multipart drive signal, thereby providing a multi-pass display update process; and
a controller configured to:
combine content of the first, second, third, and fourth memory structures to form an index for accessing the look-up table;
use the index to look-up the intermediate representation of the set of electrical drive signals in the look-up table, wherein the intermediate representation comprises a plurality of look-up table indices, each look-up table index associated with drive signal polarity and duration to be applied to the display in distinct passes, thereby providing a multi-pass display update process; and
drive the display based at least in part on the set of electrical drive signals, thereby updating the display from the current optical state to the next optical state.

14. The display driving system of claim 13 wherein the controller is further configured to update the third memory structure each time the display is updated, so as to maintain the cumulative charge history.

15. The display driving system of claim 13 wherein the controller is configured to form an index for each of at least multiple pixels of the display, and to use each of those indices to look-up a corresponding intermediate representation of a set of electrical drive signals for an associated pixel, and to drive the display based at least in part on each set of electrical drive signals.

16. The display driving system of claim 13 wherein each pass of the multi-pass display update process is associated with a maximum frame count with respect to all pixels, and in response to the drive signal duration for a given pixel and a given pass being less than the maximum frame count, the controller is further configured to set the drive signal polarity to a neutral value for any remaining frames of that pass until the maximum frame count is reached.

17. The display driving system of claim 13 wherein the controller is further configured to commence the drive signal polarity at the beginning of a given pass rather than later in a given pass.

18. A mobile computing device comprising the display driving system of claim 13.

* * * * *